(12) United States Patent
Wang

(10) Patent No.: US 9,344,434 B2
(45) Date of Patent: May 17, 2016

(54) GET VPN GROUP MEMBER REGISTRATION

(71) Applicant: Hangzhou H3C Technologies Co., Ltd., Hangzhou (CN)

(72) Inventor: Zhanqun Wang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/372,732

(22) PCT Filed: Jul. 9, 2013

(86) PCT No.: PCT/CN2013/079035
§ 371 (c)(1),
(2) Date: Jul. 16, 2014

(87) PCT Pub. No.: WO2014/008846
PCT Pub. Date: Jan. 16, 2014

(65) Prior Publication Data
US 2015/0295936 A1    Oct. 15, 2015

(30) Foreign Application Priority Data

Jul. 9, 2012 (CN) .......................... 2012 1 0234859

(51) Int. Cl.
*G06F 17/00* (2006.01)
*H04L 9/32* (2006.01)
*H04L 29/06* (2006.01)

(52) U.S. Cl.
CPC .......... *H04L 63/105* (2013.01); *H04L 63/0272* (2013.01); *H04L 63/065* (2013.01); *H04L 63/20* (2013.01); *H04L 63/205* (2013.01); *H04L 63/08* (2013.01); *H04L 63/102* (2013.01)

(58) Field of Classification Search
USPC ........................................ 726/1, 15; 713/168
See application file for complete search history.

(56) References Cited

U.S. PATENT DOCUMENTS

2008/0083011 A1* 4/2008 McAlister ............... H04L 63/20
726/1

FOREIGN PATENT DOCUMENTS

| CN | 1399441 | | 2/2003 |
| CN | 101355425 | A | 1/2009 |
| CN | 102413465 | A | 4/2012 |
| CN | 102447690 | | 5/2012 |

OTHER PUBLICATIONS

International Search Report and Written Opinion dated Oct. 17, 2013 issued on PCT Patent Application No. PCT/CN2013/079035 dated Jul. 9, 2013, The State Intellectual Property Office, P.R. China.

* cited by examiner

*Primary Examiner* — Aravind Moorthy
(74) *Attorney, Agent, or Firm* — Mannava & Kang, P.C.

(57) ABSTRACT

An example of the present disclosure includes a Group Member (GM) registering on a Key Server (KS) in a Group Encrypted Transport Virtual Private Network (GET VPN). The KS is to manage at least one group, and GMs belonging to the same group have the same group ID. The KS receives a group ID and a Security Association, SA, policy list supported by a GM sent by the GM. The KS, according to the group ID, determines a KS SA policy list corresponding to the group, and matches the SA policy list supported by the GM with the KS SA policy list according to a priority. A group SA policy with the highest priority is sent the GM.

12 Claims, 3 Drawing Sheets

GET VPN GROUP MEMBER REGISTRATION

CLAIM FOR PRIORITY

The present application is a national stage filing under 35 U.S.C. 371 of PCT application number PCT/CN2013/079035, having an international filing date of Jul. 9, 2013, which claims priority of China application number 201210234859.X having a filing date of Jul. 8, 2012, the disclosure of which is hereby incorporated by reference in its entirety.

BACKGROUND

Group Encrypted Transport Virtual Private Network (GET VPN) is a solution for centralized key and security policy management. The typical application of GET VPN is embodied in the protection of multicast traffic, such as, security transmission of audio, video broadcast and multicast files. GET VPN provides a new group-based IP security (IPsec) model. A group is a security policy set. All members belonging to the same group share the same security policy and key. GET VPN includes a Key Server (KS) and a Group Member (GM). The KS is configured to manage different security policies and keys for different groups. The GM may obtain a security policy and a key from the KS by joining an appropriate group, and is responsible for encryption and decryption of data traffic. GMs belonging to the same group have the same group ID.

BRIEF DESCRIPTION OF DRAWINGS

In order to make technical solutions in examples of the present disclosure clearer, accompanying figures are provided. Obviously, the accompanying figures to be described hereinafter are only some examples of the present disclosure.

Features of the present disclosure are illustrated by way of example and not limited to the following figures, in which like numerals indicate like elements, in which.

DETAILED DESCRIPTION

Figure 1:
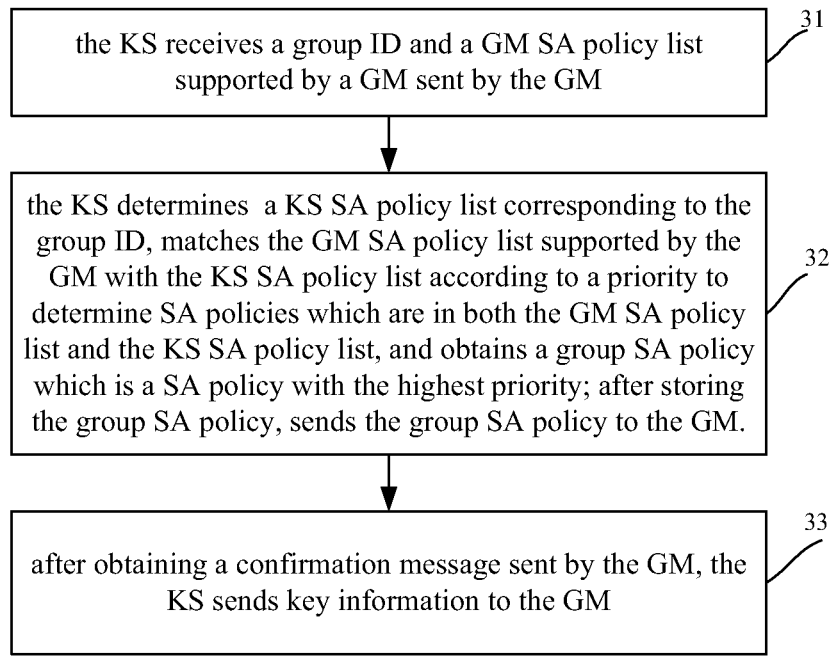
FIG. 1 is a flowchart illustrating a method for a GM to register on a KS in GET VPN according to an example of the present disclosure.

In GET VPN, a GM needs to register on a KS. The registration process includes the following two stages of negotiations.

The first stage negotiation is an internet key exchange (IKE) protocol negotiation. In the first stage negotiation, the GM negotiates with the KS to authenticate the identity of each other. When the authentication is completed, an IKE Security Association (SA) for protecting a second stage negotiation is generated.

The second stage negotiation is a Group Domain of Interpretation (GDOI) negotiation, of which the negotiation procedure is defined according to the GDOI protocol. In the second stage negotiation, the GM gets a security policy from the KS.

Specifically, the registration process may include the following processes.

The GM and the KS execute the first stage negotiation, namely, the IKE negotiation. The GM sends a group identity (ID) of the group to which the GM belongs to the KS. The KS sends a SA policy of a corresponding group to the GM according to the group ID provided by the GM. The SA policy includes information of data traffic to be protected, encryption algorithm, authentication algorithm, encapsulation mode, and so on. The GM authenticates the received SA policy, and if the SA policy is acceptable, for instance, the security protocol and encryption algorithm are supportable, the GM sends a confirmation message to the KS. The KS receives the confirmation message sent by the GM, and sends key information including a Key Encryption Key (KEK) and a Traffic Encryption Key (TEK) to the GM.

Through the above-mentioned process, the GM obtains a SA policy and a key from the KS. After the GM obtains the SA policy and the key, the data encryption and decryption may be performed among GMs.

In GET VPN, when obtaining the SA policy and the key from the KS, the GM provides a group ID to the KS, and the KS determines the corresponding SA policy and key information to be issued according to the group ID sent by the GM. In one example, the GM may only send the group ID to the KS to get the key and SA policy from the KS. In the new GDOI protocol (RFC6407), if not accepting the SA policy issued by the KS, the GM notifies the KS that it is necessary to delete the IKE SA generated in the first stage negotiation, and terminate the negotiation.

In conventional technical solutions, if the KS supports a new encryption or authentication algorithm, it is necessary for all GMs in a group to upgrade to support the new algorithm. Otherwise, the GMs will be unable to join the group. Or, if GMs in one group are located in different areas, and some algorithm, for instance, AES256 algorithm, is not supported in part of the areas, when the encryption algorithm configured in the KS is the AES256 algorithm, GMs located in the part of the areas will not be able to register successfully. Accordingly, the KS may be incompatible with GMs with different capabilities, and has a poor scalability.

In examples of the present disclosure, the KS may send a SA policy according to the capability of a GM. The GM provides a SA policy list supported by itself to the KS, and the KS may match its SA policy list with the SA policy list supported by the GM. Thus, algorithms supported by the GM may be utilized effectively, and compatibility, and scalability of the KS may be improved. When the KS supports a new encryption and authentication algorithm, as long as the algorithm supported by the GM is in the SA policy list of the KS, the GM may register successfully on the KS. It is not necessary for all GMs in the group to upgrade to support the new algorithm, thereby reducing the overhead of version upgrades.

Examples will now be described with reference to accompanying drawings.

FIG. 1 is a flowchart illustrating a method for a GM to register on a KS in GET VPN according to an example of the present disclosure. In the example, it is mainly described that the GM and the KS execute the second stage negotiation. The first stage negotiation is performed before the second stage negotiation, and the first stage may be performed according to the description above. As shown in FIG. 1, the method of performing the second stage negotiation is described below.

At block 31, the KS receives a group ID and a GM SA policy list supported by a GM and sent by the GM.

At block 32, the KS, according to the group ID, determines a KS SA policy list corresponding to the group ID, matches the GM SA policy list supported by the GM with the KS SA policy list according to a priority to determine SA policies which are in both the GM SA policy list and the KS SA policy list, and obtains a group SA policy which is a SA policy with the highest priority among said SA policies which are in both the GM SA policy list and KS SA policy list. After storing the group SA policy, the KS sends the highest priority group SA policy to the GM. For example, when determining the KS SA policy list corresponding to the group ID, the KS may search for a KS SA policy list corresponding to the group ID in local storage and may search a remote storage which may be on other servers for the KS SA policy list. Subsequently, the GM performs a confirmation on received group SA policy, and sends a confirmation message to the KS.

Furthermore, when not obtaining the group SA policy in block 32, the KS may send a notification message that the KS does not obtain a group SA policy to the GM. The GM receiving the notification message may delete the IKE SA generated in the first stage negotiation for protecting the second stage negotiation, and terminate the second stage negotiation.

At block 33, after obtaining the confirmation message sent by the GM, the KS sends key information to the GM. The key information may include a KEK and a TEK.

In addition, the KS may store a GM SA policy list supported by a GM sent by the GM.

For a GM which is the first one registering on the KS in a group, a group SA policy may be generally obtained, and the specific process for obtaining the group SA policy may refer to FIG. 1. When at least one GM in the group has registered on the KS, the KS may have stored a group SA policy. If a current GM in the group wants to register on the KS, the KS may determine whether the current GM supports the group SA policy stored in the KS after receiving a SA policy list supported by the current GM. When the current GM supports the group SA policy, the KS sends the group SA policy to the current GM, and then performs the block 33. Otherwise, the KS may perform a match among the GM SA policy list supported by the current GM, a KS SA policy list corresponding to the group, and at least one GM SA policy list supported by other GM in the group which has registered on the KS according to priorities for determining SA policies which are in all of the GM SA policy list supported by the current GM, a KS SA policy list corresponding to the group, and at least one GM SA policy list supported by other GM in the group which has registered on the KS, and obtains a group SA policy supported by all GMs in the group, the group SA policy may be a SA policy with the highest priority among the SA policies which are in all of the GM SA policy list supported by the current GM, a KS SA policy list corresponding to the group, and at least one GM SA policy list supported by other GM in the group which has registered on the KS, and sends the group SA policy supported by all GMs in the group to the current GM. Simultaneously, the KS may store the group SA policy supported by all GMs in the group, and notify other GMs in the group which have registered on the KS of the group SA policy. Other GMs in the group which have registered on the KS update the group SA policy stored locally after receiving the notification message for updating the group SA policy. Thus, it may be ensured that all GMs which have registered on the KS use the same group SA policy.

If the KS does not obtain the group SA policy supported by all GMs in the group, that is to say, there is no SA policy supported by all above-mentioned lists, the KS sends a notification message that no group SA policy is obtained to the current GM, and then the negotiation process is terminated.

Figure 2:
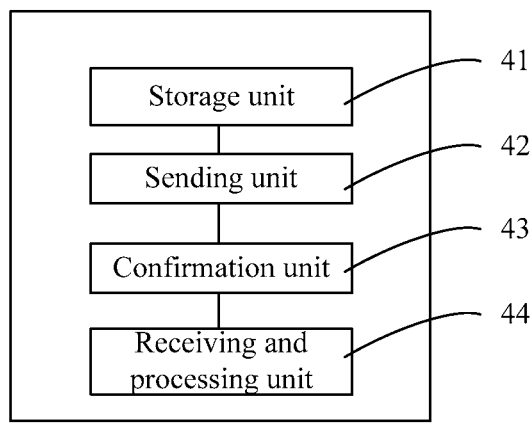
FIG. 2 is a schematic diagram illustrating a structure of a GM according to an example of the present disclosure.

FIG. 2 is a schematic diagram illustrating a structure of a GM according to an example of the present disclosure. As shown in FIG. 2, the GM may include a storing unit 41, a sending unit 42, a confirmation unit 43 and a receiving and processing unit 44. The units in FIG. 2 and other figures described below may include machine readable instructions executed by hardware or hardware only.

The storage unit 41 is configured to store a GM SA policy list supported by the GM, and is further configured to store a group SA policy and key information obtained from a KS.

The sending unit 42 is configured to send a group ID of the group to which the GM belongs and the GM SA policy list supported by the GM stored in the storage unit 41 to the KS.

The confirmation unit 43 is configured to perform a confirmation according to the group SA policy sent by the KS, and sends a confirmation message to the KS.

The receiving and processing unit 44 is configured to receive a notification message, sent by the KS, that no group SA policy is obtained, delete the IKE SA generated in the first stage negotiation for protecting the second stage negotiation, and terminate the second stage negotiation. The receiving and processing unit 44 is further configured to receive a notification message, sent by the KS, for updating the group SA policy, and update the group SA policy stored in the storage unit 41.

Figure 3:
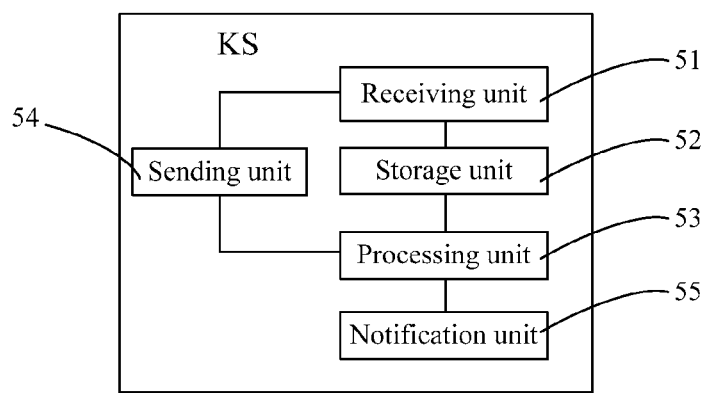
FIG. 3 is a schematic diagram illustrating a structure of a KS according to an example of the present disclosure.

FIG. 3 is a schematic diagram illustrating a structure of a KS according to an example of the present disclosure. As shown in FIG. 3, the KS may include a receiving unit 51, a storage unit 52, a processing unit 53 and a sending unit 54.

The receiving unit 51 is configured to receive a group ID of a group to which a GM belongs and a GM SA policy list supported by the GM sent by the GM; and is further configured to receive a confirmation message sent by the GM.

The storage unit 52 is configured to store a KS SA policy list corresponding to each group; is further configured to store the GM SA policy list supported by the GM received by the receiving unit 51; and is further configured to store a group SA policy obtained by the processing unit 53.

The processing unit 53 is configured to, according to the group ID of the group to which the GM belongs, determine (e.g. search out) a KS SA policy list corresponding to the group, match the GM SA policy list supported by the GM with the KS SA policy list corresponding to the group, obtain a group SA policy with highest priority, and send the group SA policy to the storage unit 52 and the sending unit 54.

The sending unit 54 is configured to send the group SA policy to the GM; and is further configured to send key information to the GM after the receiving unit 51 receives the confirmation message sent by the GM.

When at least one GM in the group has registered on the KS, the storage unit 52 may have stored a group SA policy. If a current GM in the group wants to register on the KS, the processing unit 53 is further configured to determine whether the current GM supports the group SA policy stored in the storage unit 52 according to a GM SA policy list supported by the current GM. When the current GM supports the group SA policy, the processing unit 53 instructs the sending unit 54 to send the group SA policy to the current GM. Otherwise, the processing unit 53 may perform a match among the GM SA policy list supported by the current GM, a KS SA policy list corresponding to the group, and at least one GM SA policy list supported by other GM in the group which has registered on the KS according to the priority, and obtain a group SA policy supported by all GMs in the group, and instruct the sending unit 54 to send the group SA policy supported by all GMs in the group to the current GM.

The storage unit 52 is further configured to update the currently stored group SA policy after the processing unit 53 obtains the group SA policy supported by all GMs in the group.

Furthermore, the KS may further include a notification unit 55, which is configured to notify the current GM that no group SA policy is obtained when the processing unit 53 does not obtain the group SA policy; and is further configured to notify other GMs in the group which have registered on the KS that the group SA policy needs to be updated when the processing unit 53 obtains the group SA policy.

Figure 4:
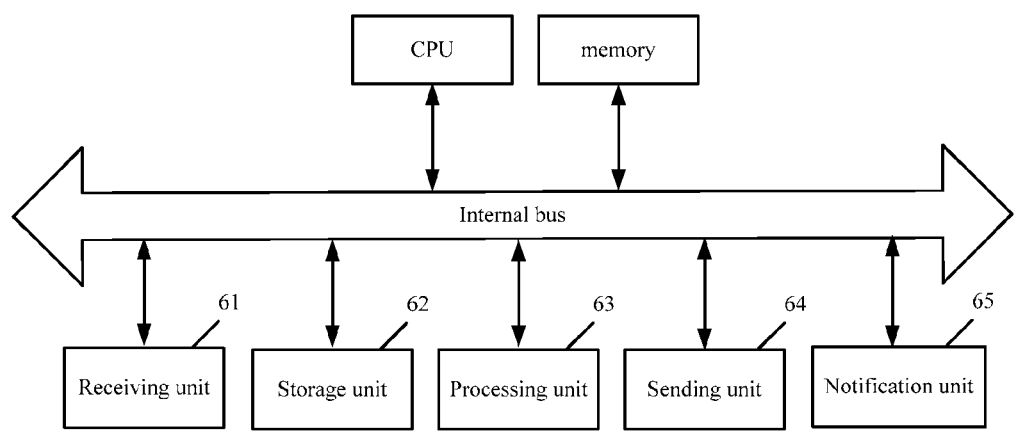
FIG. 4 is a schematic diagram illustrating another structure of the KS according to an example of the present disclosure.

The units in the above examples and examples described below are divided based on logical functions. In examples, the functions of one unit may be achieved by multiple units, or the functions of multiple units may be achieved by one unit. In other examples of the present disclosure, the KS may include other units. For example, FIG. 4 is a schematic diagram illustrating another structure of the KS according to an example of the present disclosure. As shown in FIG. 4, the KS may include the receiving unit 61, the storage unit 62, the processing unit 63, the sending unit 64, the notification unit 65, a CPU and a memory. These units may be connected to each other via an internal bus or may be embodied as machine readable instructions executed by the CPU and stored in the memory. Functions of the units is further described with respect to FIG. 5.

Examples of the functions of each unit in the GM and the KS are now described in detail hereinafter with reference to FIG. 1.

At block 31, at first, the sending unit 42 of the GM sends a group ID of the group to which the GM belongs and a GM SA policy list supported by the GM to the KS.

Subsequently, the receiving unit 51 of the KS receives the group ID of the group to which the GM belongs and the GM SA policy list supported by the GM, and stores the GM SA policy list supported by the GM to the storage unit 52.

The GM SA policy list supported by the GM includes multiple SA polices. Each SA policy in the GM SA policy list may have a priority, that is to say, the SA policies in the GM SA policy list may be arranged in a descending order according to the priorities.

At block 32, the processing unit 53 of the KS may, according to the group ID of the group to which the GM belongs, determine a KS SA policy list corresponding to the group (e.g. search the storage unit 52 for a KS SA policy list corresponding to the group), match the GM SA policy list supported by the GM with the KS SA policy list corresponding to the group for determining SA policies which are in both the GM SA policy list supported by the GM and the KS SA policy list corresponding to the group, obtain a group SA policy which is a SA policy with the highest priority among said SA policies which are in both the GM SA policy list supported by the GM and the KS SA policy list corresponding to the group, and send the group SA policy to the storage unit 52 and the sending unit 54. The sending unit 54 sends the group SA policy to the GM to be stored in the storage unit 41.

A KS SA policy list includes multiple SA polices. Each SA policy in the KS SA policy list may have a priority, that is to say, the SA policies in the KS SA policy list may be arranged in a descending order according to the priorities. SA policies in the GM SA policy list supported by the GM may be matched with SA policies in the KS SA policy list in a descending order according to the priorities, and a SA policy with the highest priority supported by both lists is referred to as a group SA policy.

If the KS does not obtain the group SA policy, namely, there is no SA policy supported by both lists, the KS sends a notification message for notifying that no group SA policy is obtained to the GM through the notification unit 55.

After receiving the notification message sent by the KS, the receiving and processing unit 44 of the GM deletes the IKE SA generated in the first stage negotiation for protecting the second stage negotiation, and terminates the second stage negotiation. Specifically, the KS may send the GM a Notify Message, and type of the message may be NO-PROPOSAL-CHOSEN as described in RFC2408 to inform the GM that no group SA policy is obtained.

At block 33, the confirmation unit 43 of the GM performs a confirmation according to the group SA policy sent by the KS, and sends a confirmation message to the KS. After the receiving unit 51 of the KS receives the confirmation message sent by the GM, the KS sends key information to the GM through the sending unit 54.

When the first GM in a group registers on the KS, a group SA policy may be generally obtained, and the specific process for obtaining the group SA policy may refer to FIG. 1. When at least one GM in the group has registered on the KS, the KS may have stored a group SA policy. If a current GM in the group wants to register on the KS, after the receiving unit 51 of the KS receives the GM SA policy list supported by the current GM, and the GM SA policy list supported by the current GM is stored in the storage unit 52, the processing unit 53 may determine whether the current GM supports the group SA policy stored in the KS. If the GM SA policy list supported by the current GM includes the group SA policy, the KS directly sends the group SA policy to the current GM through the sending unit 54, and subsequently the block 33 is performed. Otherwise, the processing unit 53 of the KS may perform a match among the GM SA policy list supported by the current GM, a KS SA policy list corresponding to the group, and at least one GM SA policy list supported by other GM in the group which has registered on the KS according to priorities for determining SA policies which are in all of the GM SA policy list supported by the current GM, a KS SA policy list corresponding to the group, and at least one GM SA policy list supported by other GM in the group which has registered on the KS, and obtains a group SA policy supported by all GMs in the group, and instructs the sending unit 54 to send the group SA policy supported by all GMs in the group to the current GM. Since the GM SA policy lists respectively supported by the GM which has registered on the KS and the current GM which want to register on the KS in the group may have a priority, and the KS SA policy list corresponding to the group also may have a priority, the multiple lists may be matched in a descending order according to the priority, and a SA policy with the highest priority supported by all lists is taken as updated group SA policy, stores the group SA policy in the storage unit 52, and instructs the sending unit 54 to send the group SA policy to current GM, instructs the notification unit 55 to notify other GM in the group which has registered on the KS for updating the group SA policy. The receiving and processing unit 44 of the GM which has registered on the KS receives the notification message for updating the group SA policy sent by the KS, and updates the group SA policy stored in the storage unit 42. Thus, it may be ensured that all GMs which have registered on the KS use the same group SA policy.

If the KS does not obtain the group SA policy supported by all GMs in the group, that is to say, there is no SA policy supported by all above-mentioned lists, the KS sends, through the notification unit 55, a notification message that no group SA policy is obtained to the current GM, and then the negotiation process is terminated.

In summary, according to an example, the current GM which wants to register on the KS sends a GM SA policy list supported by the current GM to the KS, and the KS performs a match and obtains a group SA policy. Thus, even if the capability of the current GM is poor, for instance, the current GM only supports some algorithms, as long as the algorithm is in the KS SA policy list, the current GM may register successfully on the KS. Furthermore, if at least one GM in the group has registered on the KS, the current GM which wants to register on the KS provides the GM SA policy list supported by the current GM to the KS, and the KS may determine whether to use a group SA policy stored in the KS or to obtain a new group SA policy from a match. Thus, the GM may register successfully on the KS to a great extent.

The methods and devices provided by examples of the present disclosure may be achieved by hardware, or machine-readable instructions, or a combination of hardware and machine-readable instructions. The machine-readable instructions may be stored, by at least one processor, in a non-transitory computer readable storage medium, such as a hard disk, a floppy disk, a magnetic disk, compact disk (e.g., CD-ROM, CD-R, CD-RW, DVD-ROM, DVD-RAM, DVD-RW and DVD+RW), a tape, a nonvolatile memory card, ROM and other suitable storage device. Or part of the machine-readable instructions may be achieved by specific hardware, such as custom integrated circuits, gate arrays, FPGA, PLD, a computer of specific functions, etc.

Examples of the present disclosure also provide a computer readable storage medium, which is configured to store machine-readable instructions for making a computing device (may be a personal computer, a server, a network device, etc.,) execute the method of the examples. Specifically, the system and device provided by the examples of the present disclosure all include a computer readable storage medium, which stores machine-readable program codes for achieving functions of above mentioned examples. The system and device (or CPU or MPU) may read out and execute the machine-readable program codes stored in the computer readable storage medium.

In this case, the program codes read from the computer readable storage medium can achieve anyone of above mentioned examples. Therefore, the program codes and the storage medium storing the program codes are a part of technical solutions of the present disclosure.

The storage medium for providing program codes includes a hard disk, a floppy disk, a magnetic disk, compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

It should be noted that, for the program codes being executed by a computer, a part of or all of operations achieved by the program codes may be implemented by an operating system running on a computer, so as to achieve technical solutions of anyone of example mentioned above. The computer executes instructions based on the program codes.

The program codes in the storage medium are written in a memory, and the memory is located in an extended board inside a computer, or in an extended unit connected with a computer. In the example, a CPU on the extended board or the extended unit executes a part of or all of the actual operations based on the program codes, so as to realize technical solutions of any of the aforementioned embodiments.

Figure 5:
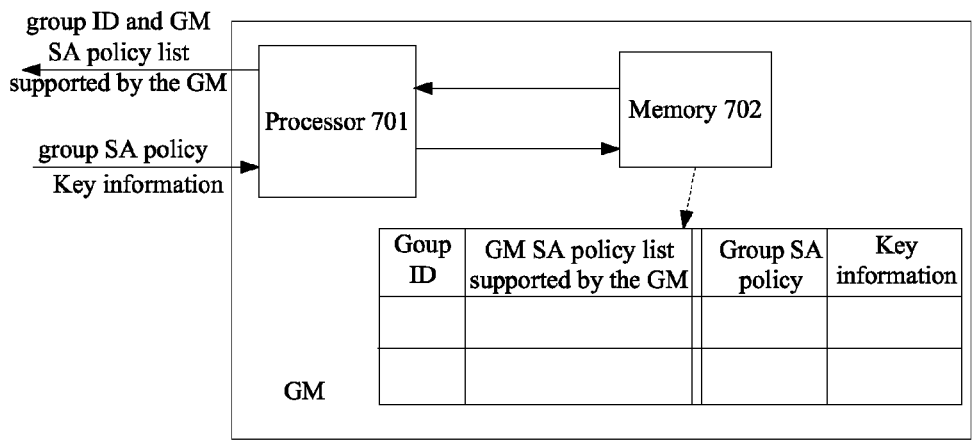
FIG. 5 is a schematic diagram illustrating another structure of the GM according to an example of the present disclosure.

For example, FIG. 5 is a schematic diagram illustrating another structure of the GM according to an example of the present disclosure. As shown in FIG. 5, the GM may include a processor 701 and a memory 702. The memory 702 has a communication connection with the processor 701, and is configured to store a group ID of a group to which the GM belongs, a GM SA policy list supported by the GM, and a group SA policy and key information sent by a KS.

The processor 701 is configured to send the group ID of the group to which the GM belongs and the GM SA policy list supported by the GM stored in the memory 702 to the KS. After receiving a group SA policy sent by the KS, the processor 701 sends a confirmation message to the KS, and stores the group SA policy and key information obtained from the KS to the memory 702. After receiving a notification message, sent by the KS, that no group SA policy is obtained, the processor 701 deletes the IKE SA generated in the first stage negotiation for protecting the second stage negotiation, and terminates the second stage negotiation. After receiving a notification message, sent by the KS, for updating the group SA policy, the processor 701 updates the group SA policy stored in the memory 702.

Figure 6:
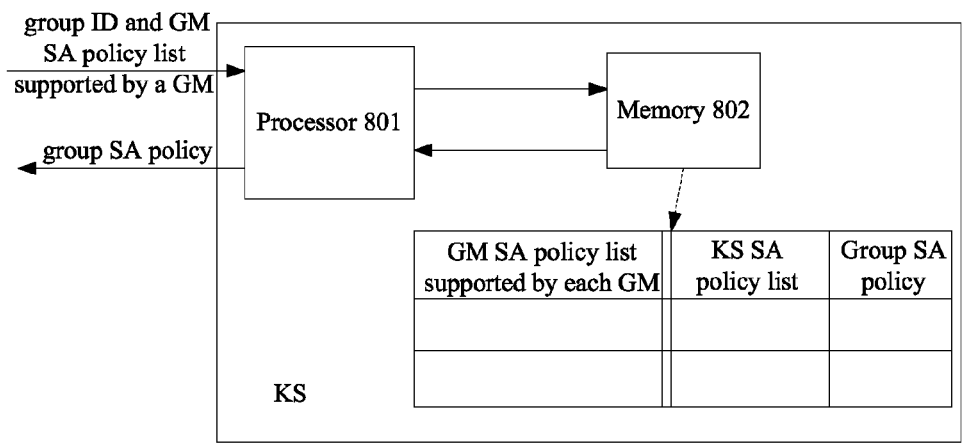
FIG. 6 is a schematic diagram illustrating yet another structure of the KS according to an example of the present disclosure.

FIG. 6 is a schematic diagram illustrating yet another structure of the KS according to an example of the present disclosure. As shown in FIG. 6, the KS may include a processor 801 and a memory 802. The memory 802 has a communication connection with the processor 801, and is configured to store a KS SA policy list corresponding to each group, a GM SA policy list supported by a GM, and a group SA policy with the highest priority obtained from a match.

The processor 801 is configured to receive a group ID of a group to which a GM belongs and a GM SA policy list supported by the GM sent by the GM; and is further configured to store the GM SA policy list supported by the GM to the memory 802; according to the group ID of the group to which the GM belongs, determines (e.g. search out) a KS SA policy list corresponding to the group, match the GM SA policy list supported by the GM with the KS SA policy list corresponding to the group for determining SA policies which are in both the GM SA policy list supported by the GM and the KS SA policy list corresponding to the group, obtain a group SA policy with highest priority, store the group SA policy in the memory 802, and send the group SA policy to the GM; after receiving a confirmation message sent by the GM, send key information to the GM.

When at least one GM in the group has registered on the KS, since the memory 802 has stored a group SA policy, for a current GM in the group wanting to register on the KS, the processor 801 is further configured to determine whether the current GM supports the group SA policy stored in the memory 802 according to the GM SA policy list supported by the current GM. When the current GM supports the group SA policy, the processor 801 sends the group SA policy to the current GM. Otherwise, the processor 801 may perform a match among the GM SA policy list supported by the current GM, a KS SA policy list corresponding to the group, and at least one GM SA policy list supported by other GM in the group which has registered on the KS according to the priorities for determining SA policies which are in all of the GM SA policy list supported by the current GM, a KS SA policy list corresponding to the group, and at least one GM SA policy list supported by other GM in the group which has registered on the KS, and obtain a group SA policy supported by all GMs in the group among said SA policies which are in all of the GM SA policy list supported by the current GM, a KS SA policy list corresponding to the group, and at least one GM SA policy list supported by other GM in the group which has registered on the KS, and send the group SA policy supported by all GMs in the group to the current GM; at the same time, the processor 802 updates the group SA policy stored in the memory 802, and notifies other GMs which have registered on the KS for updating their group SA policies; when no group SA policy supported by all GMs is obtained, notifies the current GM that no group SA policy supported by all GMs is obtained.

The foregoing description is only preferred embodiments of the present invention and is not used for limiting the protection scope thereof. Any modification, equivalent substitution, or improvement made without departing from the spirit and principle of the present invention should be covered by the protection scope of the present invention.

The invention claimed is:

1. A method for a Group Member, GM, to register on a Key Server (KS) in a Group Encrypted Transport Virtual Private Network (GET VPN) in which the KS is to manage at least one group, and GMs belonging to the same group have the same group ID; the method comprising:
   receiving, by the KS from the GM, a group ID and a GM Security Association (SA) policy list of SA policies supported by the GM;
   determining, by the KS, a KS SA policy list of SA policies corresponding to the group ID;
   determining, by the KS, SA policies which are in both the GM SA policy list and the KS SA policy list; and
   obtaining, by the KS, a group SA policy which is a SA policy with the highest priority among said SA policies which are in both the GM SA policy list and KS SA policy list;
   after storing the group SA policy, sending, by the KS, the group SA policy to the GM;
   after receiving a confirmation message of the GM, sending, by the KS, key information to the GM.

2. The method according to claim 1, comprising:
   when the KS determines a group SA policy cannot be identified for the GM, sending, by the KS, a notification message that the KS does not obtain a group SA policy to the GM, wherein the GM deletes an internet key exchange, IKE, SA for protecting a second stage negotiation generated in a first stage negotiation, and terminates the second stage negotiation.

3. The method according to claim 1, the method further comprising:
   storing, by the KS, the GM SA policy list sent by the GM.

4. The method according to claim 3, the method further comprising:
   when at least one GM in a group has registered on the KS, for a current GM in the group which want to register on the KS, determining, by the KS, whether the current GM supports a group SA policy stored in the KS according to a GM SA policy list supported by the current GM.

5. The method according to claim 4, further comprising:
   when the current GM supports the group SA policy, sending, by the KS, the group SA policy to the current GM; and
   when the current GM does not support the group SA policy, performing, by the KS, a match among the GM SA policy list supported by the current GM, a KS SA policy list corresponding to the group ID, and at least one GM SA policy list supported by other GM in the group which has registered on the KS, and obtaining, by the KS, a group SA policy supported by all GMs in the group, and sending, by the KS, the group SA policy supported by all GMs in the group to the current GM.

6. The method according to claim 5, the method further comprising:
   when the KS determines a group SA policy supported by all GMs in the group cannot be identified, sending, by the KS, a notification message that the KS does not obtain a group SA policy supported by all GMs in the group to the current GM.

7. The method according to claim 5, the method further comprising:
   when obtaining, by the KS, the group SA policy supported by all GMs in the group, updating, by the KS, the group SA policy stored in the KS, and notifying, by the KS, other GMs which have registered on the KS of the group SA policy, wherein other GMs in the group which have registered on the KS update the group SA policy stored in locally after receiving the notification for updating the group SA policy.

8. A Group Member, GM to register on a Key Server, KS, in a Group Encrypted Transport Virtual Private Network, GET VPN, and the KS is to manage at least one group, and GMs belonging to the same group have the same group ID, the GM comprising: a processor; and a memory, wherein the memory has a communication connection with the processor, and is to store a group ID of a group to which the GM belongs, a GM SA policy list supported by the GM, and a group SA policy sent by a KS, and
   the processor is to send the group ID of the group to which the GM belongs and the GM SA policy list supported by the GM stored in the memory to the KS; perform a confirmation according to the group SA policy sent by the KS, and send a confirmation message to the KS.

9. The GM according to claim 8, wherein the processor is further to:
   after receiving a notification message, sent by the KS, that no group SA policy is obtained, delete an IKE SA generated in a first stage negotiation for protecting a second stage negotiation, and terminate the second stage negotiation; and
   after receiving a notification message, sent by the KS, for updating the group SA policy, update the group SA policy stored in the memory.

10. A Key Server, KS to register a Group Member, GM, on the KS in a Group Encrypted Transport Virtual Private Network, GET VPN, and the KS is to manage at least one group, and GMs belonging to the same group have the same group ID; the KS comprising: a processor; and a memory, wherein the memory has a communication connection with the processor, and is to store a KS SA policy list corresponding to each group, a GM SA policy list supported by a GM, and a group SA policy with the highest priority obtained from a match, and wherein
   the processor is to receive a group ID of a group to which a GM belongs and a GM SA policy list supported by the GM sent by the GM,
   according to the group ID of the group to which the GM belongs, determine a KS SA policy list corresponding to the group,
   match the SA policy list supported by the GM with the KS SA policy list corresponding to the group for determining SA policies which are in both the SA policy list supported by the GM and the KS SA policy list corresponding to the group,
   obtain a group SA policy which is a SA policy with the highest priority among said SA policies which are in both the SA policy list supported by the GM and the KS SA policy list corresponding to the group, store the group SA policy in the memory, and send the group SA policy to the GM, and after receiving a confirmation message sent by the GM, send key information to the GM.

11. The KS according to claim 10, wherein the processor is to:

when at least one GM in the group has registered on the KS, for a current GM in the group wanting to register on the KS, determine whether the current GM supports the group SA policy stored in the memory according to the GM SA policy list supported by the current GM, when the current GM supports the group SA policy, send the group SA policy to the current GM, when the current GM does not support the group SA policy, perform a match among the GM SA policy list supported by the current GM, a KS SA policy list corresponding to the group, and at least one GM SA policy list supported by other GM in the group which has registered on the KS according to the priority, and obtain a group SA policy supported by all GMs in the group, and send the group SA policy supported by all GMs in the group to the current GM, and update the group SA policy stored in the memory.

12. The KS according to claim 11, wherein the processor is to:

when no group SA policy supported by all GMs is obtained, notify the current GM that no group SA policy supported by all GMs is obtained, and when the group SA policy supported by all GMs is obtained, notify other GMs which have registered on the KS that the group SA policy needs to be updated.

* * * * *